June 22, 1948.

H. SIMPSON 2,443,873

HAND DEVICE FOR SLICING OR SHREDDING
VEGETABLES AND OTHER FOODSTUFFS
Filed May 7, 1945

Inventor,
Harold Simpson

Patented June 22, 1948

2,443,873

UNITED STATES PATENT OFFICE 2,443,873

HAND DEVICE FOR SLICING OR SHREDDING VEGETABLES AND OTHER FOODSTUFFS

Harold Simpson, London, England

Application May 7, 1945, Serial No. 592,326
In Great Britain May 23, 1944

2 Claims. (Cl. 146—171)

The invention comprises improvements in or relating to hand devices for slicing or shredding vegetables and other foodstuffs.

The invention is concerned with a slicing or shredding device of the type comprising a knife-supporting frame in the form of a hollow box open at both ends, a plurality of knives extending in parallel across the interior of the box and having their ends anchored to the box sides and a handle attached to the box frame. In operating the device the vegetable, for example a runner bean, is pushed through one open end of the box against the knives and the sliced or shredded parts are pulled through the other end of the box.

The present invention consists of a hand device for slicing or shredding vegetables and other foodstuffs comprising a knife-supporting frame in the form of a hollow box open at both ends, a plurality of knives extending in parallel across the interior of the box, two separator strips separate from the frame, located within the throughway of the box and having slits through which the knives are threaded and are maintained in spaced parallel relationship, wire-like elements extending in the depthwise direction of the box frame, anchored thereto, and threaded through holes in the ends of the knives to constrain the knives against endwise displacement, and on each side of each separator strip a small integral clip portion bent over and around the edges of the box frame into engagement with the exterior thereof.

In its preferred form the slicing or shredding device comprises a knife-supporting box frame formed from a single strip of metal doubled upon itself to provide at one end a closed eye and at the other end a shank constituted by the two strip thicknesses closed one against the other, a handle for receiving the aforesaid shank endwise therein, a plurality of knives extending in parallel across the interior of the eye of the supporting frame, two separator strips located within and at opposite sides respectively of the eye and having spaced slits through which the ends of the knives are threaded, wing portions integral with the separator strips and bent to form clips extending over and round the edges of the eye and on to the exterior surface of the frame, and wire-like elements extending in the depthwise direction of the box frame, anchored to it, and threaded through holes in the ends of the knives beyond the slits in the separator strips.

An example embodying the invention will now be described with reference to the accompanying drawings in which:

Figures 2 and 3 are cross-sections in planes at right-angles of the knife-carrying frame with associated parts.

Figure 1:
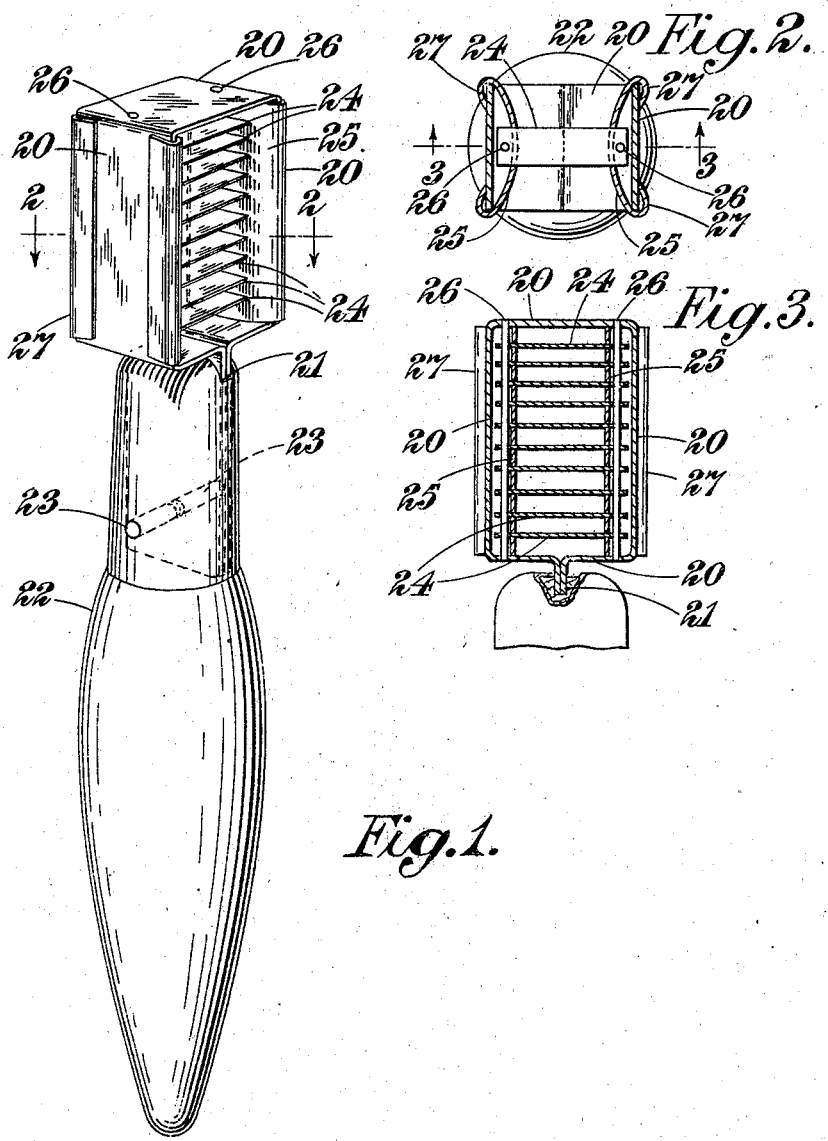
Figure 1 is a perspective view of the slicing or shredding device.

The knife-supporting frame is constructed by bending a sheet metal strip to form an eye portion 20 of rectangular box section and integral therewith a shank 21 constituted by two thicknesses of the strip brought close together. The shank 21 is received endwise in a straight handle 22 to which it is secured by one or more rivets 23 or, alternatively, by screws. The knives 24, of which there may be any convenient number (say ten), are double-edged and of a thickness comparable with that of a safety razor blade. The width of the knives 24 is substantially less than that of the box throughway in which they are located. The knives are secured in a parallel row at the centre of the box throughway in the following manner. A small hole is drilled through each knife at each end thereof. The knives are held in spaced parallel relationship by two bowed separator strips 25 eventually located within the throughway of the box with their convexities opposed to one another. Slits of approximately the same length as the width of the knives 24 are formed in the separator strips 25 at the desired spaced relationship and the ends of the knives are threaded through the slits so that the small holes are located at the outside of the separator strips. A wire 26 is threaded through each set of knife holes and at its opposite ends is pinned to the box frame. Each separator strip 25 at its sides is bent round the corresponding marginal edges of the box frame forming integral clips or wing portions 27 and secured thereto by welding or soldering. It will be appreciated that since the knives 24 are of substantially less width than the width of the box throughway, and are located centrally therein, both edges of the knives are adequately protected.

I claim:

1. A hand device for slicing or shredding vegetables and other foodstuffs comprising a knife-supporting frame in the form of a hollow box open at both ends, a plurality of knives extending in parallel across the interior of the box, two separator strips separate from the frame, located within the throughway of the box and having slits through which the knives are threaded and are maintained in spaced parallel relationship, wire-like elements extending in the depthwise direction of the box frame, anchored thereto, and threaded through holes in the ends of the knives to constrain the knives against endwise displacement, and on each side of each separator strip a small integral clip portion bent over and round the edge of the box frame into engagement with the interior thereof.

2. A slicing or shredding device comprising a knife-supporting box frame formed from a single strip of metal doubled upon itself to provide at one end a closed eye and at the other end a shank constituted by the two strip thicknesses closed one against the other, a handle for receiving the aforesaid shank endwise therein, a plurality of knives extending in parallel across the interior of the eye of the supporting frame, two separate strips located within and at opposite sides respectively of the eye and having spaced slits through which the ends of the knives are threaded, wing portions integral with the separator strips and bent to form clips extending over and round the edges of the eye and on to the exterior surface of the frame, and wire-like elements extending in the depthwise direction of the box frame, anchored to it, and threaded through holes in the ends of the knives beyond the slits in the separator strips.

HAROLD SIMPSON.

REFERENCES CITED

The following references are of record in the file of this patent:

UNITED STATES PATENTS

| Number | Name | Date |
| --- | --- | --- |
| 1,795,231 | Perl | Mar. 3, 1931 |
| 1,984,034 | Ryan | Dec. 11, 1934 |
| 2,010,222 | Coughlan | Aug. 6, 1935 |
| 2,010,414 | Rekonty | Aug. 6, 1935 |
| 2,109,303 | Ogletree | Feb. 22, 1938 |
| 2,220,169 | Murdock | Nov. 5, 1940 |
| 2,288,639 | Ogletree | July 7, 1942 |
| 2,323,863 | Feemster | July 6, 1943 |

FOREIGN PATENTS

| Number | Country | Date |
| --- | --- | --- |
| 560,846 | Great Britain | Apr. 24, 1944 |